United States Patent
Martin (10) Patent No.: US 6,676,055 B1
(45) Date of Patent: Jan. 13, 2004

(54) TAPE REEL ASSEMBLY WITH TAPE DRIVE CLUTCH ENGAGEMENT FEATURE

(75) Inventor: Robert C. Martin, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/302,125

(22) Filed: Nov. 22, 2002

(51) Int. Cl.$^7$ .............................................. G11B 23/04
(52) U.S. Cl. ........................ 242/340; 242/611; 360/85; 360/93
(58) Field of Search ................................ 242/340, 342, 242/348, 348.2, 611, 611.1; 360/85, 93, 132

(56) References Cited

U.S. PATENT DOCUMENTS

| | | |
|---|---|---|
| 3,857,531 A | 12/1974 | Jantzen |
| 4,654,740 A | 3/1987 | Katoku |
| 4,775,115 A | 10/1988 | Gelardi |
| 5,366,173 A | 11/1994 | Lammers et al. |
| 5,564,647 A | 10/1996 | Bay et al. |
| 5,992,782 A * | 11/1999 | Goodknight ................ 242/340 |
| 6,154,342 A * | 11/2000 | Vanderheyden et al. .... 360/132 |
| 6,273,352 B1 | 8/2001 | Johnson et al. |
| 6,279,845 B1 * | 8/2001 | Hemzacek et al. ......... 242/340 |
| 6,411,466 B1 * | 6/2002 | Shima et al. ................ 360/132 |
| 6,491,247 B2 * | 12/2002 | Huettenegger .............. 242/342 |

* cited by examiner

Primary Examiner—William A. Rivera
(74) Attorney, Agent, or Firm—Eric D. Levinson (57) ABSTRACT

A tape reel assembly including a hub, opposing upper and lower flanges, a plurality of reel teeth, and three engagement features. The opposing upper and lower flanges extend in a radial fashion from opposing sides of the hub. The reel teeth extend axially outwardly relative to the hub. The three engagement features are equidistantly spaced within the reel teeth and are configured to provide a dominant mating surface relative to surfaces of the plurality of reel teeth. With this configuration, the three engagement features mate with teeth of the tape drive clutch, and prevent meshed engagement with the remaining reel teeth. Thus, the three engagement features dictate the plane of contact between the tape reel assembly and the drive clutch, with the reel teeth serving as general guide surfaces that facilitate this interaction. The engagement features can be pronounced drive teeth or reduced-sized valleys.

23 Claims, 6 Drawing Sheets

TAPE REEL ASSEMBLY WITH TAPE DRIVE CLUTCH ENGAGEMENT FEATURE

BACKGROUND OF THE INVENTION

The present invention relates to interface between a tape reel assembly of a data storage tape cartridge and a tape drive clutch. More particularly, it relates to an engagement feature configured to provide dominant surfaces for mating between teeth of a tape reel assembly and teeth of a tape drive clutch, thereby dictating consistent reel/clutch engagement.

Data storage tape cartridges have been used for decades in the computer, audio, and video fields. The data storage tape cartridge continues to be an extremely popular device for recording large volumes of information for subsequent retrieval and use.

A data storage tape cartridge generally consists of an outer shell or housing containing at least one tape reel assembly and a length of magnetic storage tape. The storage tape is wrapped about a hub portion of the tape reel assembly and is driven through a defined tape path by a driving system. The housing normally includes a separate cover and base, the combination of which forms an opening (or window) at a forward portion thereof for allowing access to the storage tape by a read/write head upon insertion of the data storage tape cartridge into a tape drive. This interaction between storage tape and head may take place within the housing (for example, with a mid-tape load design), or the storage tape may be directed away from the housing to an adjacent area at which the read/write head is located (for example, with a helical drive design or a leader block design). Where the tape cartridge/drive system is designed to direct the storage tape away from the housing, the data storage tape cartridge normally includes a single tape reel assembly. Conversely, where the tape cartridge/drive system is configured to provide head/storage tape interaction within or very near the housing, a two- or dual-tape reel assembly configuration is typically employed.

Regardless of the number of tape reel assemblies associated with a particular data storage tape cartridge, the tape reel assembly itself is generally comprised of three basic components: namely, an upper flange, a lower flange, and a hub. The hub forms an outer, tape-winding surface about which the storage tape is wound. The flanges are disposed at opposite ends of the hub and are spaced to approximate the height of the storage tape. Finally, the tape reel assembly is adapted to be engaged by a drive clutch upon insertion into a tape drive, with the drive clutch causing the tape reel assembly to rotate in a desired fashion.

The well-accepted technique for facilitating interaction between the tape reel assembly and drive clutch is known as a "poker chip" design whereby both the drive clutch and the tape reel assembly employ multiple, circularly arranged teeth designed to mate with one another. When mated, these teeth act both to locate the tape reel assembly at a center of the tape path, and to transmit torque from the tape drive motor/clutch to the tape reel assembly. To this end, one typical tooth design entails sixty teeth on both the tape reel assembly and drive clutch. As used throughout this specification, the tape reel assembly teeth situated to interact with the tape drive are referred to as "tape reel teeth" or "reel teeth", whereas the corresponding tape drive/clutch teeth are referred to as "drive clutch teeth" or "drive teeth".

Regardless of the number of teeth, upon insertion of the tape cartridge into the drive, the tape reel assembly is generally aligned with the drive clutch. The tape reel assembly is then maneuvered toward the drive clutch (and/or the drive clutch moved toward the tape reel) such that the drive clutch teeth are guided into meshed engagement with the reel teeth. This meshed relationship facilitates rotation of the tape reel by the drive clutch. At any one point in time, however, only three of the tape reel teeth are in true contact with the drive clutch teeth, as a plane of interface can only be defined by three points. Unfortunately, it is virtually impossible with current tape reel assembly designs to predict or dictate which three reel teeth will define the interface plane due to their preferred, uniform nature. As a point of reference, tape reel assembly components, including the reel teeth, are plastic molded parts. Molding imperfections in the surface of the tape reel teeth, systematic deviations in angular spacing of the teeth due to an off-centered gate location and/or mold cooling profile, trapped debris and/or tooth damage due to wear all contribute to defining which three teeth on the tape reel actually contact/engage the drive clutch/teeth. As a result, when a cartridge is ejected and then re-inserted into a drive, a different set of three teeth will almost certainly mate with the drive clutch teeth, thus changing both the elevation and wobble of the tape reel assembly with each re-insertion. Further, if the three reel teeth that ultimately contact the drive clutch teeth are not evenly distributed around a center of the tape reel assembly, the tape reel assembly can rock or wobble on the drive clutch during use.

The above-described inherent inconsistencies in tape reel/drive clutch interface may lead to operation errors. To this end, a study was performed to estimate tape reel assembly wobble and elevation error as a function of angular error in the tape reel teeth. This analysis revealed that as little as ten minutes of angular error in the tape reel teeth can result in up to 35 mils of vertical run-out at the outer diameter of a "standard" hub flange, and up to 14 mils of elevation error. In light of the continued evolution of storage tape technology toward increasingly smaller track widths, these deviations may present distinct opportunities for performance errors.

Data storage tape cartridges are important tools used to maintain vast amounts of information. As the cartridge and drive components continue to evolve, alignment deviations/inconsistencies between the tape reel assembly and drive clutch are less tolerable. Therefore, a need exists for a tape reel or drive clutch configured to consistently dictate the points of contact between tape reel teeth and drive clutch teeth.

SUMMARY OF THE INVENTION

One aspect of the present invention relates to a tape reel assembly for a data storage tape cartridge. The tape reel assembly includes a hub, opposing upper and lower flanges, a plurality of reel teeth, and three engagement features. The hub defines a tape-winding surface. The opposing upper and lower flanges extend in a radial fashion from opposing sides of the hub, respectively. The plurality of reel teeth extend axially outwardly relative to the hub. The reel teeth are circularly arranged for interacting with corresponding teeth of a drive clutch. Finally, the three engagement features are equidistantly spaced within the reel teeth. In this regard, the engagement features are each configured to provide a dominant mating surface relative to surfaces of the plurality of reel teeth. With this configuration, the three engagement features consistently mate with teeth of a tape drive clutch. During use, as the drive clutch is directed into engagement with the tape reel assembly, the three engagement features dictate the plane of contact between the tape reel assembly and the drive clutch, with the reel teeth serving as general guide surfaces that facilitate this interaction. In other words, the three engagement features always mate with the drive clutch teeth, thus defining both the elevation and wobble of the tape reel irrespective of insertion position. In one preferred embodiment, the engagement features are pronounced reel teeth, having a height or axial extension greater than that of the remaining reel teeth. In another preferred embodiment, the engagement features are provided in the form of a reduced-sized valley between two adjacent reel teeth. In particular, with this one preferred embodiment, the plurality of reel teeth define a plurality of valleys, with each valley being generated between two adjacent teeth. The reduced-sized valley associated with the engagement features are smaller in terms of depth or width than the remaining valleys, again dictating that ultimate drive clutch teeth contact occur at the point of these engagement features.

Another aspect of the present invention relates to a data storage tape cartridge including a housing, at least one tape reel assembly, and a storage tape. The housing includes a base and a cover that combine to define an enclosed space. The base forms at least one tape reel opening. The at least one tape reel assembly includes a hub, opposing upper and lower flanges, a plurality of reel teeth and three engagement features. The hub defines a tape-winding surface. The opposing upper and lower flanges extend in a radial fashion from opposing sides of the hub, respectively. The plurality of reel teeth extend axially outwardly relative to the hub, and are circularly arranged. The three engagement features are equidistantly spaced within the reel teeth. In this regard, the at least one tape reel assembly is disposed within the housing such that the reel teeth and engagement features are accessible through the tape reel opening. Finally, the storage tape is wound about the tape-winding surface of the hub. The engagement features are each configured to provide a dominant mating surface relative to surfaces of the plurality of reel teeth. This configuration dictates that upon insertion of the data storage tape cartridge into a tape drive, the teeth of an associated drive clutch will consistently mate only with the engagement features, thereby ensuring tape reel assembly/drive clutch stability.

Yet another aspect of the present invention relates to a tape reel assembly for a data storage tape cartridge. The tape reel assembly includes a hub, opposing upper and lower flanges, and a plurality of reel teeth. The hub defines a tape-winding surface. The opposing upper and lower flange extend in a radial fashion from opposing sides of the hub, respectively. Finally, the plurality of reel teeth extend axially outwardly relative to the hub. The reel teeth are circularly arranged, and each reel tooth is defined by opposing side surfaces. With this in mind, the plurality of reel teeth include a plurality of guide teeth and three equidistantly spaced dominant tooth arrangements. The opposing side surfaces of the guide teeth each have corresponding lengths and angular orientations. In contrast, the dominant tooth arrangements each include at least one dominant tooth, at least one opposing side surface of which has a dominant length and/or dominant angular orientation that differs from the length and/or angular orientation of the guide teeth. With this configuration, then, contact between teeth of a drive clutch and the tape reel assembly occurs only at the dominant tooth arrangements. In one preferred embodiment, the dominant tooth arrangements are configured to prevent the drive clutch teeth from engaging the guide teeth.

Yet another aspect of the present invention relates to a tape drive clutch of a tape drive mechanism for operatively engaging tape reel teeth of a data storage tape cartridge. The tape drive clutch includes a plurality of drive clutch teeth and three, equidistantly spaced engagement features. The engagement features are provided within the drive clutch teeth and provide dominant mating surfaces relative to surfaces of the drive clutch teeth. With this configuration, the three engagement features consistently mate with tape reel teeth of the data storage tape cartridge, dictating a plane of contact between the drive clutch and the tape reel. In one preferred embodiment, the engagement features are dominant drive clutch teeth; in another preferred embodiment, the engagement features are dominant valleys.

DESCRIPTION OF THE PREFERRED EMBODIMENTS

Figure 1:
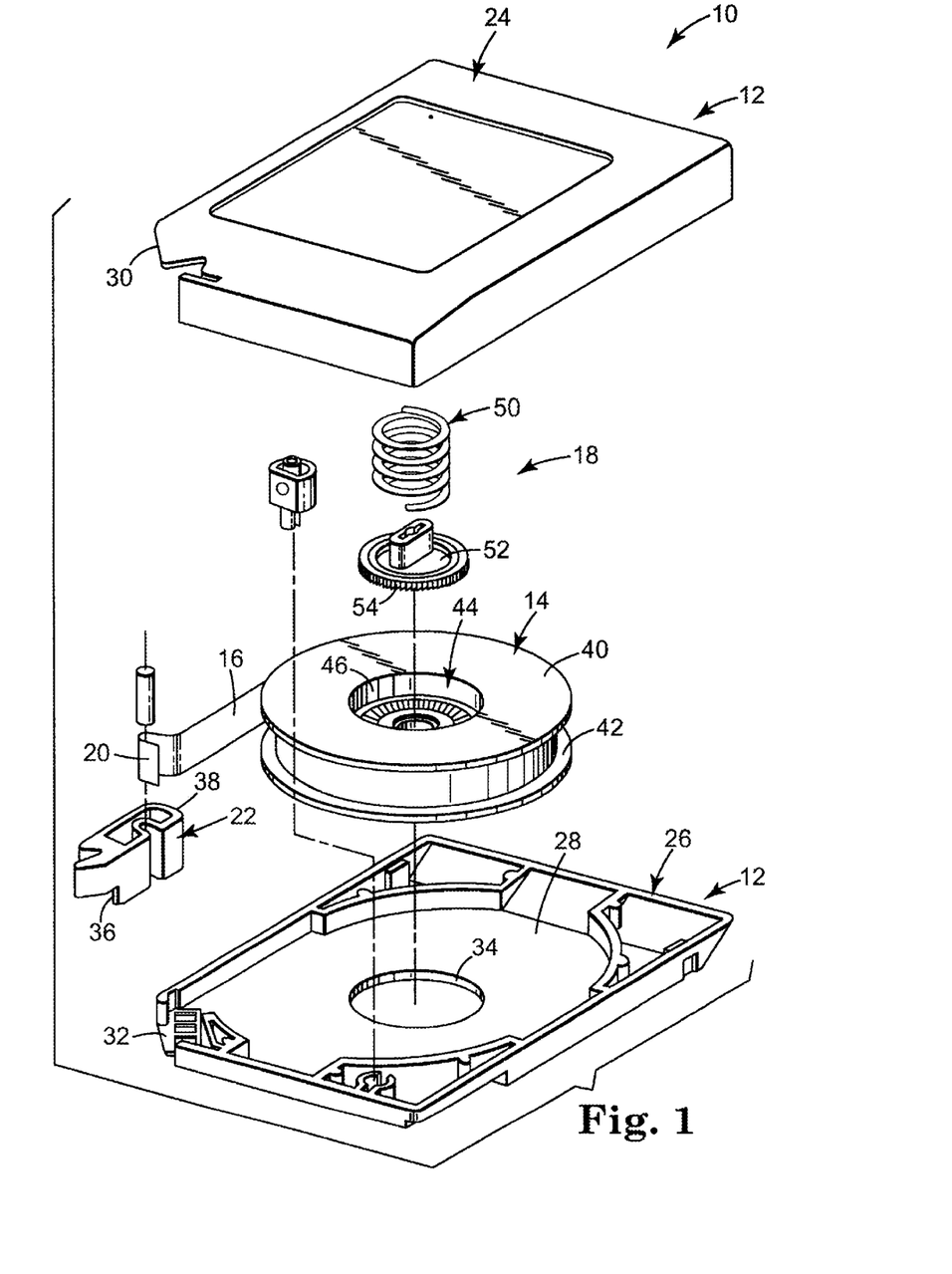
FIG. 1 is a perspective, exploded view of an exemplary data storage tape cartridge in accordance with the present invention.

One aspect of the present invention relates to a tape reel assembly useful with a data storage tape cartridge. In this regard, an exemplary data storage tape cartridge 10 is shown in FIG. 1. Generally speaking, the data storage tape cartridge 10 includes a housing 12, at least one tape reel assembly 14, a storage tape 16, and a brake assembly 18. The tape reel assembly 14 is disposed within the housing 12. The storage tape 16, in turn, is wound about a portion of the tape reel assembly 14, and includes a free end 20 attached to a leader block 22. Finally, the brake assembly 18 is centrally positioned within a portion of the tape reel assembly 14, and is connected to a portion (not shown) of the housing 12. As a point of reference, the tape reel assembly 14 of the present invention is useful not only with the single reel-type data storage tape cartridge 10 shown in FIG. 1, but also with a dual-reel design that is otherwise known in the art.

The housing 12 is sized in accordance with industry-accepted tape drive form factors, and is preferably generally rectangular. Alternatively, other shapes such as square are equally acceptable. With this in mind, the housing 12 is defined by a first housing section 24 and a second housing 26. In one preferred embodiment, the first housing section 24 serves as a cover, whereas the second housing section 26 is a base. It should be understood that as used throughout the specification, directional terminology such as "cover", "base", "upper", "lower", "top", "bottom", etc., is used for purposes of illustration only, and is in no way, limiting.

The first and second housing sections 24, 26 are configured to be reciprocally mated to one another to define an enclosed space 28 (referenced generally in FIG. 1) for maintaining various other components of the data storage tape cartridge 10. With specific reference to the exemplary single reel design of FIG. 1, the housing 12 is preferably rectangular, except for one corner 30 that is angled and forms a leader block window 32. The leader block window 32 is configured to hold the leader block 22 and serves as an opening for the storage tape 16 to exit from the enclosed space 28 such that the storage tape 16 can be threaded to a tape drive (not shown) when the leader block 22 is removed from the leader block window 32. Conversely, when the leader block 22 is snapped into the leader block window 32, the leader block window 32 is covered.

In addition to the leader block window 32, the second housing section 26 further forms a tape reel opening 34. The opening 34 facilitates access to the tape reel assembly 14 by a drive clutch portion of a tape drive (not shown). Conversely, the first housing section 24 includes a connector (not shown) extending from an inner face thereof. The connector is positioned opposite the opening 34 and is configured to retain a portion of the brake assembly 18. As is known to those of ordinary skill in the art, in one preferred embodiment the connector is a tab sized to slidably receive a portion of the brake assembly 18. Alternatively, the connector may assume other forms known in the art, such as a series of teeth.

Leader blocks are also well known in the art. In one embodiment, a front surface of the leader block 22 includes a slot 36 for engaging an automatic threading apparatus of a reel-to-reel magnetic tape drive apparatus (not shown) and engages an inclined surface of the corner 30 of the housing 12. A rear surface 38 is rounded to form a portion of an arc of a radius to match the periphery of the take-up hub (not shown) in the tape drive apparatus as the leader block 22 fits into a slot in the take-up hub. Alternatively, other configurations known in the art for the leader block 22 are equally acceptable. For example, the leader block 22 can be replaced by a dumbbell-shaped pin adapted to be received by the automatic threading apparatus. Even further, depending upon a desired configuration of the data storage tape cartridge 10, the leader block 22 can be eliminated, such as with a dual-tape reel design.

The tape reel assembly 14 is described in greater detail below and generally includes an upper flange 40, a lower flange 42, and a hub 44. The storage tape 16 is wound about the hub 44, constrained laterally by the flanges 40, 42. Further, the tape reel assembly 14 further defines a central opening 46 sized to receive the brake assembly 18. Upon final assembly, the central opening 46 is generally aligned with the opening 34 in the housing 12.

The storage tape 16 is preferably a magnetic tape of a type commonly known in the art. For example, the storage tape 16 can consist of a balanced polyethylene naphthalate (PEN)-based material coated on one side with a layer of magnetic material dispersed within a suitable binder system, and on the other side with a conductive material dispersed within a suitable binder system. Acceptable magnetic tape is available, for example, from Imation Corp. of Oakdale, Minn.

The brake assembly 18 is also known in the art, and preferably consists of a spring 50 and a brake body 52. The spring 50 is preferably a coil spring formed to bias the brake body 52 within the central opening 46 of the tape reel assembly 14. In this regard, the brake body 52 preferably includes a toothed surface 54 configured to engage a corresponding portion of the tape reel assembly 14 in a "locked" position. Alternatively, other forms of brake assemblies can be provided.

The tape reel assembly 14 is shown in greater detail in FIG. 2 and again includes the opposing flanges 40, 42, and the hub 44. The upper and lower flanges 40, 42 are secured to, and extend in a radial fashion from, opposite sides of the hub 44, respectively. The one preferred embodiment of the tape reel assembly 14 further includes a metal insert or washer 60. As is known in the art, the metal insert 60 is secured to the hub 44 adjacent the lower flange 42, and facilitates magnetically-induced coupling to a tape drive clutch. Alternatively, the metal insert 60 can be eliminated with other tape cartridge/tape drive designs.

Figure 2:
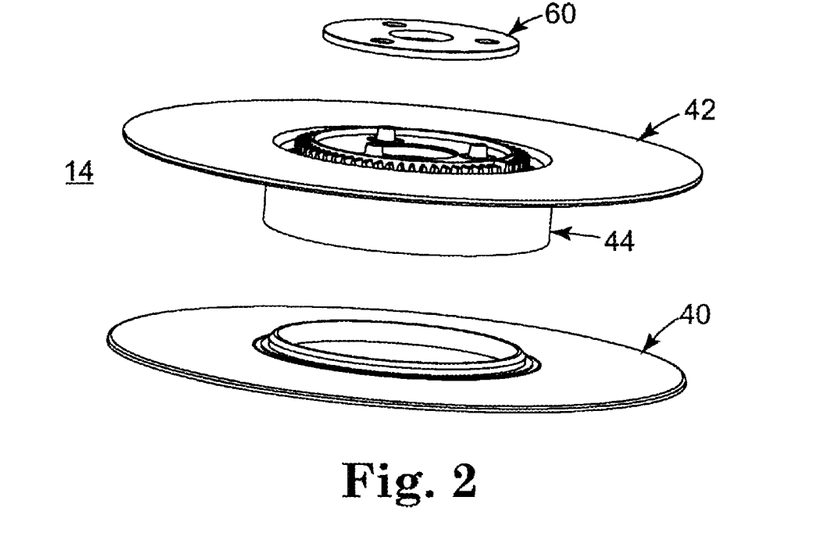
FIG. 2 is a perspective, exploded view of a tape reel assembly portion of the cartridge of FIG. 1 in accordance with the present invention.
Figure 3:
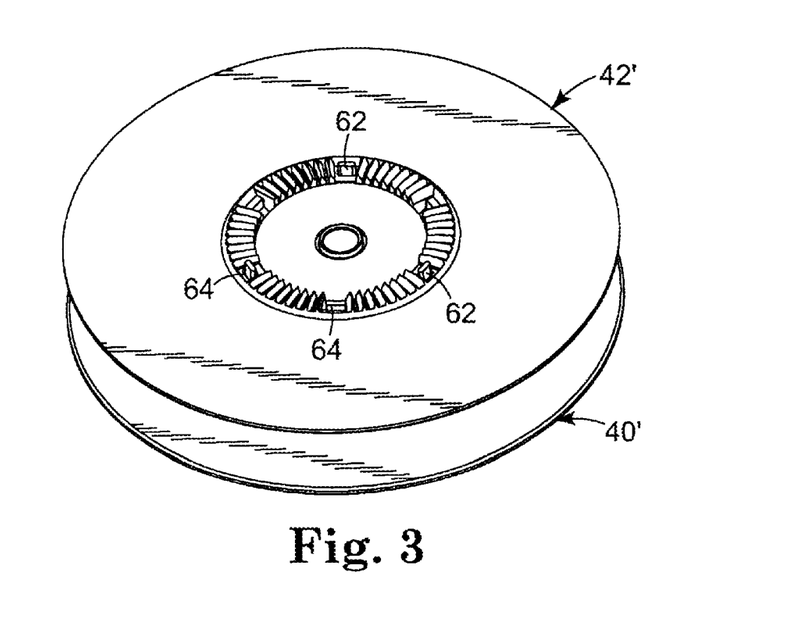
FIG. 3 is a perspective view of an alternative tape reel assembly configuration.

In addition to the metal insert 60 described above, other details associated with the tape reel assembly 14 of FIG. 2 can be varied as known in the art. For example, the tape reel assembly 14 of FIG. 2 integrally forms the hub 44 and the lower flange 42, with the upper flange 40 subsequently being assembled to the hub 44. Alternatively, and as shown in FIG. 3, a snap-together design can be utilized whereby the upper flange 40' and the lower flange 42' are formed separate from the hub (hidden in FIG. 3), with the upper flange 40' including legs 62 that mate within notches 64 formed by the lower flange 42'.

Figure 4:
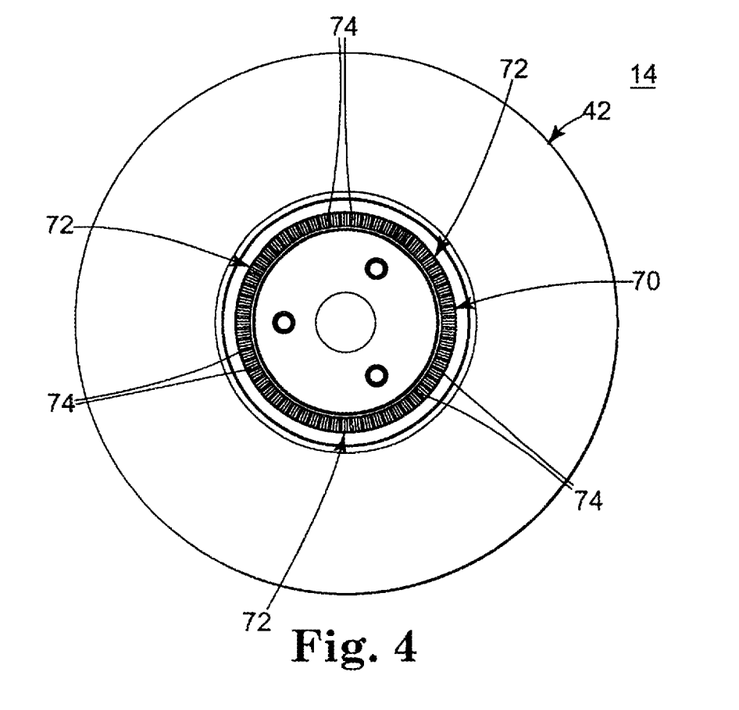
FIG. 4 is a top view of the tape reel assembly of FIG. 2.

Regardless of the exact construction, and with reference to FIG. 4, the tape reel assembly 14 further includes a plurality of reel teeth 70 (referenced generally in FIG. 4) and three, equidistantly spaced engagement features 72 (referenced generally in FIG. 4). The reel teeth 70 are arranged in a circular pattern, corresponding with the tooth configuration associated with available drive clutches (not shown). The reel teeth 70 extend axially outwardly relative to the hub 44 (FIG. 2), and, depending upon the particular tape reel assembly 14 design, are formed as part of the lower flange 42 and/or the hub 44. Regardless, the three equidistantly spaced engagement features 72 are formed within the reel teeth 70. As described in greater detail below, each engagement feature 72 provides a dominant surface(s) relative to surfaces of the remaining reel teeth 70. These dominate surface(s) dictate drive clutch contact/interface during use.

Because the engagement features 72 serve to engage/contact drive clutch teeth (not shown), in a preferred embodiment the engagement features 72 are provided as dominant tooth arrangements comprised of modifications of one or more of the "standard" reel teeth 70. With this one preferred configuration, the modified reel tooth or teeth associated with each engagement feature 72 provides the dominant surface(s) described above, with the remaining reel teeth 70 serving as guide teeth (referenced generally in FIG. 4 at 74). That is to say, the guide teeth 74 serve to facilitate proper meshed contact between the engagement features 72 and the drive clutch teeth upon initial engagement; however, the guide teeth 74 do not mate or engage the drive clutch teeth. Instead, the three engagement features 72 provide the three, sole points of contact with the drive clutch teeth, and thus consistently define a plane of interface between the tape reel assembly 14 and the drive clutch. In general terms, the engagement features 72 dictate drive clutch teeth contact by establishing a pitch line that is "above" (or more distally spaced from the hub 44) a pitch line of the guide teeth 74 as described below. Finally, the preferred equidistant spacing between the engagement features 72 (i.e., 120° from one another) further ensures that the tape reel assembly 14 is always stable on the drive clutch.

Figure 5:
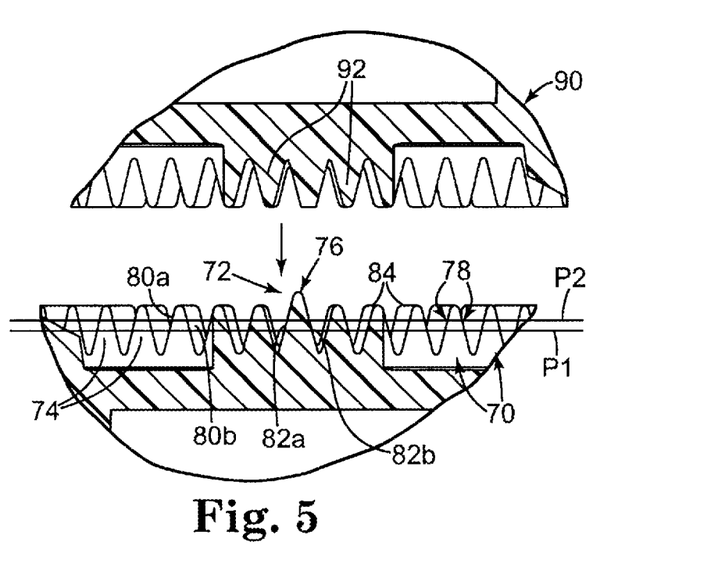
FIG. 5 is an enlarged, cross-sectional view of a portion of the tape reel assembly of FIG. 4 taken along the lines A—A in conjunction with portion of a tape drive clutch.

With the above parameters in mind, one preferred embodiment of the engagement features 72 is provided in FIG. 5. As a point of reference, FIG. 5 depicts a series of reel teeth 70 and one of the engagement features 72, it being understood that the remaining engagement features 72 are similarly configured. With the embodiment of FIG. 5, the engagement feature 72 is a modified one of the reel teeth 70, referenced as a dominant tooth 76, having a height or axial extension greater than that of the remaining reel teeth 70 (also referred to as the guide teeth 74).

Each of the reel teeth 70 are defined by opposing side surfaces 78 (referenced generally in FIG. 5). More particularly, the opposing side surfaces 78 of one of the guide teeth 74 are designated in FIG. 5 at 80a, 80b; whereas the opposing side surfaces 78 of the dominant tooth 76 are designated at 82a, 82b. The side surfaces 80a, 80b of the guide teeth 74 each have a virtually identical length and angular orientation. Conversely, while a similar angular orientation is provided, at least one of the opposing side surfaces 82a or 82b (preferably both) of the dominant tooth 76 has a length greater than that of the guide teeth 74, such that the dominant tooth 76 projects above an expected height of the guide teeth 74 by a distance in the range of 0.005–0.020 inch, more preferably approximately 0.013 inch. Stated otherwise, the guide teeth 74 are molded to each project to an approximately identical height. The dominant tooth 76 projects above this expected height, providing a surface axially beyond the tips (referenced generally at 84) of the guide teeth 74. To this end, typical molding tolerances allow for some angular error in the molded guide teeth 74, so that the guide teeth 74 are likely not identical. In fact, it has been identified that the vertical mating error between current tape reel/drive clutch configurations is dominated by angular error in the molded teeth. The referred extension of the dominant tooth 76 above the guide teeth 74 of 0.005–0.020 inch, has surprisingly been found to account for the expected angular error (i.e., ensures that the dominate tooth 76 dictates spacing between the reel teeth 70 and the drive clutch (not shown)). A variety of other dimensions could be employed that may or may not be a function of molding error.

The dominant tooth 76 establishes a pitch line that is different from a pitch line of the guide teeth 74. As a point of reference, a "pitch line" is an imaginary or theoretical line that passes through the point at which a width of the tooth is the same as the width of the valley adjacent the tooth. Effectively, then, with uniformly formed teeth and valleys, the pitch line is a plane that intersects the mid-point of a tooth or collection of commonly formed teeth. With a "standard" tooth configuration having approximately identical teeth and valleys, a singular pitch line can be approximated. As shown in FIG. 5, the guide teeth 74 collectively define a guide pitch line P1 (it being understood that the guide pitch line P1 is dictated solely by the guide teeth 74 and associated valleys, and excludes the dominant teeth 76). The dominant teeth 76 define a dominant pitch line P2 (the dominant pitch line P2 is determined by the dominant teeth 76 and excluding the guide teeth 74). The dominant pitch line P2 is above (or more distally spaced from the hub 44) the guide pitch line P1. Further, the dominant tooth 76 is wider at the guide pitch line P1 than the guide teeth 74, preferably by an amount in the range of 0.002–0.012 inch, more preferably approximately 0.007 inch (it being recalled that the guide pitch line P1 is generated without considering the dominant teeth 76). Regardless, meshed engagement will always be established with the dominant tooth 76 as opposed to the guide teeth 74.

Upon insertion into a tape drive (not shown), a drive clutch 90 having teeth 92 is directed toward the tape reel assembly 14 (shown by an arrow in FIG. 5). The protruding nature of the engagement feature 72/dominant tooth 76 dictates that the dominant tooth 76 intimately contacts or meshes with corresponding drive clutch teeth 92 regardless of the rotational position of the tape reel assembly 14 relative to the drive clutch 90. While the guide teeth 74 may assist in achieving this meshed engagement, the dominant tooth 76 alone establishes the final interface plane between the tape reel assembly 14 and the drive clutch 90.

Figure 6:
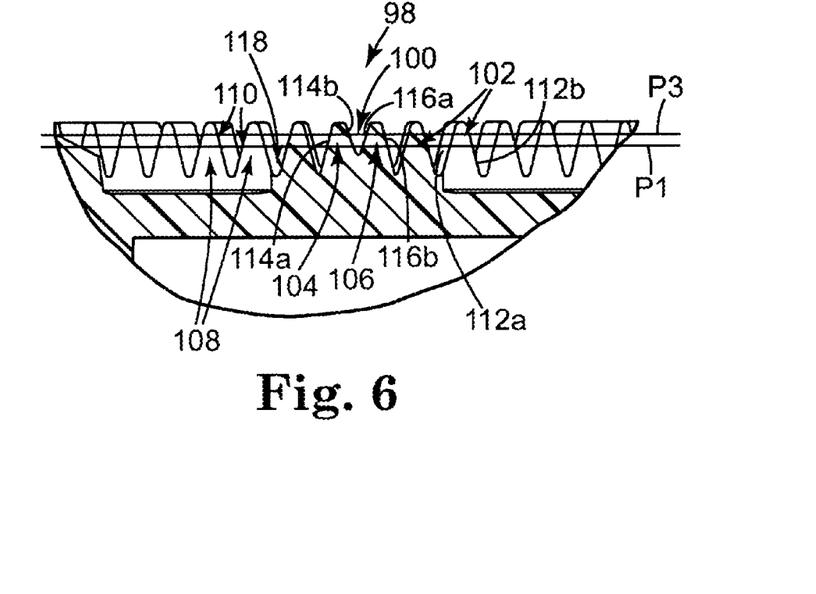
FIG. 6 is an enlarged, cross-sectional view of a portion of a tape reel assembly including an alternative embodiment engagement feature in accordance with the present invention.

The dominant tooth 76 construction of FIG. 5 is but one acceptable embodiment of the engagement feature 72. For example, FIG. 6 is, similar to FIG. 5, an enlarged, cross-sectional view of a portion of a tape reel assembly incorporating an alternative embodiment engagement feature 98 in the form of a dominant valley 100. As with the previous embodiment, the dominant valley 100 is preferably formed as a modification of selected ones of the reel teeth 102; in particular of a first modified or dominant reel tooth 104 and a second modified or dominant reel tooth 106. The modification, as described below, renders the remaining reel teeth 102 as guide teeth 108 (referenced generally in FIG. 6).

Each of the reel teeth 102 are defined by opposing side surfaces 110 (referenced generally in FIG. 6), with the guide teeth 108 having virtually identically formed side surfaces referenced at 112a, 112b. The first modified reel tooth 104 is defined by opposing side surfaces 114a, 114b, and the second modified reel tooth 106 is defined by opposing side surfaces 116a, 116b. The side surface 114a of the first modified reel tooth 104 and the side surface 116b of the second modified reel tooth 106 correspond with the generally uniform length and angular orientation provided by the side surfaces 110 of the guide teeth 108. However, the surfaces 114b and 116a vary from the remaining guide teeth 108 in terms of length. More particularly, the surfaces 114b, 116a are significantly shorter in length (in the range of 0.005–0.020 inch, more preferably approximately 0.013 inch shorter for a design having a maximum molding error of 0.013 inch), thereby establishing the dominant valley 100. By way of reference, with one available tape reel design, adjacent guide teeth 108 form guide valleys 118, each having a depth on the order of 0.159 inch. Molding tolerances may introduce minor deviations in the actual depth of the various guide valleys 118. However, relative to the shallowest guide valley 118, the dominant valley 100 is at least approximately 0.005 inch, more preferably at least approximately 0.013 inch, shorter in depth. Again, other dimensions can be employed that may or may not be a function of expected molding error.

The dominant valleys 100 establish a dominant pitch line P3 that is "above" the guide pitch line P1. Once again, the guide pitch line P1 is established only by the guide teeth 108 and corresponding guide valleys 118 and excludes the dominant valleys 100, whereas the dominant pitch line P3 is established only by the dominant valleys 100 as the point where the width of the dominant valley 100 is equal to the width of an adjacent tooth or teeth. With this in mind, the dominant valleys 100 are more narrow than the guide valleys 118 at the guide pitch line P1, preferably by an amount in the range of 0.002–0.012 inch, more preferably approximately 0.007 inch. As such, the meshed engagement will always be established at the dominant valleys 100 as opposed to the guide valleys 118.

During use and upon engagement with the drive clutch 90 (FIG. 5), one of the drive clutch teeth 92 (FIG. 5) will, by necessity, first nest within a corresponding dominant valley 100, with the remaining drive clutch teeth 92 being generally positioned in a non-contacting fashion within the guide valleys 118. Thus, the engagement feature 98 of FIG. 6 dictates that drive clutch tooth meshed engagement always occur against the first and second dominant or modified reel teeth 104, 106. Notably, with the embodiment of FIG. 6, the modified reel teeth 104, 106 do not extend above an upper plane otherwise defined by the guide teeth 108. As a result, the opportunity for damage to the engagement feature 98 is minimized.

Figure 7:
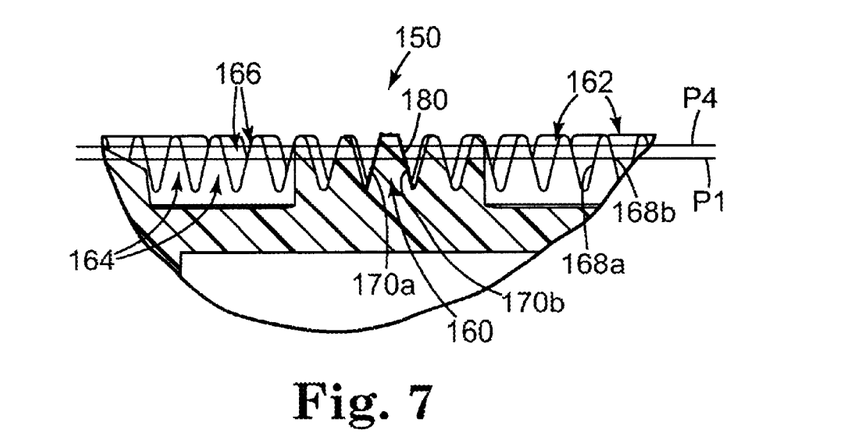
FIG. 7 is an enlarged, cross-sectional view of a portion of a tape reel assembly including another alternative embodiment engagement feature in accordance with the present invention.

Yet another alternative embodiment of an engagement feature 150 in accordance with the present invention is illustrated in FIG. 7 in the form of a dominant tooth 160. Similar to previous embodiments, the dominant tooth 160 is formed as a modification of one of the reel teeth 162. Because the dominant tooth 160 dictates the point of drive clutch tooth contact, the remaining reel teeth 162 are referred to as guide teeth 164. Once again, each of the reel teeth 162 are defined by opposing side surfaces 166 (referenced generally in FIG. 7), with the opposing side surfaces of the guide teeth 164 referenced at 168a, 168b and the opposing side surfaces of the dominant tooth 160 referenced at 170a, 170b. The opposing side surfaces 168a, 168b of the guide teeth 164 have a virtually identical length and angular orientation (within certain molding tolerances). The side surfaces 170a, 170b of the dominant tooth 160 have a similar length, such that the dominant tooth 160 extends to a height corresponding with the guide teeth 164. However, at least one, preferably both, of the side surfaces 170a, 170b are formed at an angular orientation varying from that of the guide teeth 164 such that the dominant tooth 160 is wider than the guide teeth 164.

The increased width of the dominant tooth 160 is best described with respect to pitch lines. Once again, the guide teeth 104 and associated valleys establish the guide pitch line P1 that excludes the dominant teeth 160. Conversely, the dominant teeth 160 and associated valleys establish a dominant pitch line P4 that is "above" the guide pitch line P1. With these definitions in mind, the dominant tooth 160 is wider at the guide pitch line P1 than the guide teeth 164. In one preferred embodiment, a pitch line width of the dominant tooth 160 at the guide pitch line P1 is 0.002–0.012 inch, more preferably approximately 0.007 inch, greater than a pitch line width of the guide teeth 164 at the guide pitch line P1. This one preferred configuration ensures that the dominant tooth 160 will initially mesh between teeth 92 (FIG. 5) of the drive clutch 90 (FIG. 5) and prevents meshed engagement of the drive clutch teeth 92 with the guide teeth 164.

Figure 8:
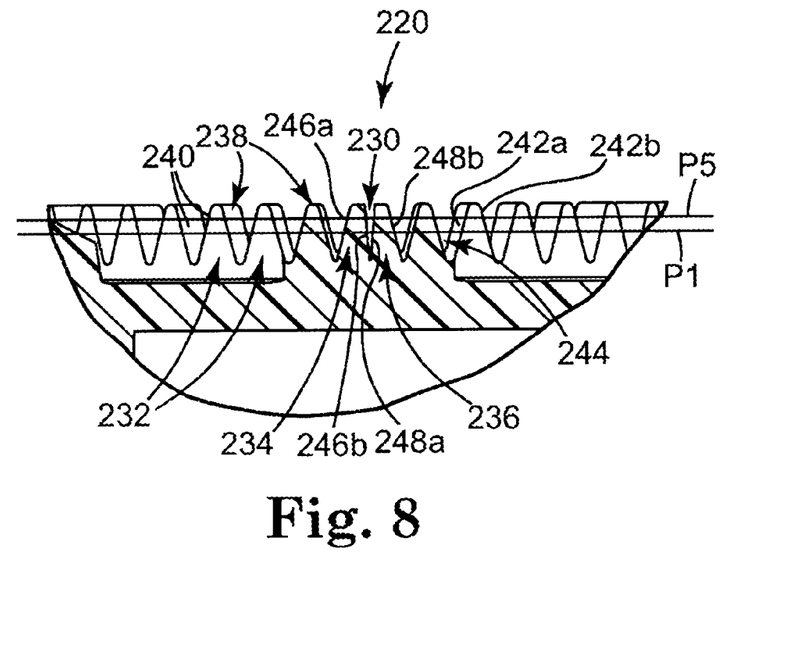
FIG. 8 is an enlarged, cross-sectional view of a portion of a tape reel assembly including another alternative embodiment engagement feature in accordance with the present invention.

Yet another alternative embodiment of an engagement feature 220 in accordance with the present invention is illustrated in FIG. 8, again in the form of a dominant valley 230. Similar to the embodiment of FIG. 6, the dominant valley 230 of FIG. 8 is preferably formed as a modification of certain ones of the reel teeth 232, in particular of a first and second modified (or quasi-dominant) reel tooth 234, 236. Because the dominant valley 230 dictates the point of drive clutch tooth contact, the remaining reel teeth 232 are referred to as guide teeth 238. Each of the reel teeth 232 are defined by opposing side surfaces 240 (referenced generally in FIG. 8), with each of the guide teeth 238 including opposing side surfaces 242a, 242b, adjacent ones of which combine to define guide valleys 244. The first modified reel tooth 234 is defined by opposing side surfaces 246a, 246b; whereas the second modified reel tooth 236 is defined by opposing side surfaces 248a, 248b. The side surface 246a of the first modified reel tooth 234 and the side surface 248b of the second modified reel tooth 236 correspond with the generally uniform length and angular orientation associated with the side surfaces 242a, 242b of the guide teeth 238. However, the side surfaces 246b, 248a vary in angular orientation as compared to the guide teeth 238, to establish the dominant valley 230.

With the embodiment of FIG. 8, the dominant valley 230 has a depth virtually identical to a depth of the guide valleys 246. However, the dominant valleys 230 define a dominant pitch line P5 that is "above" the guide pitch line P1 (that again excludes the dominant valleys 230). Further, the dominant valleys 230 have a more narrow width at the guide pitch line P1 as compared to a width of the guide valleys 244 at the guide pitch line P1. In one preferred embodiment, the width of the dominant valleys 230 at the guide pitch line P1 is less than a width of the guide valleys 244 at the guide pitch line P1 by an amount in the range of 0.002–0.012 inch, more preferably approximately 0.007 inch. Regardless, the decreased width of the dominant valleys 230 at the guide pitch line P1 or the "elevated" dominant pitch line P5 ensures that a corresponding drive clutch tooth 92 (FIG. 5) always nests within the dominant valleys 230 prior to others of the drive clutch teeth 92 nesting within or intimately contacting the guide valleys 244. That is to say, due to the reduced width of the dominant valley 230, contact between the tape reel assembly (FIG. 2) and the drive clutch teeth 92 will always occur at the engagement feature 220, within the dominant valleys 230, against the first and second modified reel teeth 234, 236. The engagement feature 220 prevents the drive clutch teeth 92 from engaging or meshing with the guide teeth 238.

Although the above-described embodiments of the engagement feature 72 have been illustrated as variations of a standard reel tooth or teeth, other configurations can be employed. For example, the engagement feature 72, 98, 150, 220 can be formed as something other than an extension or modification of an existing reel tooth. That is to say, the engagement feature 72, 98, 150, 220 need not necessarily be formed as a tooth or teeth, or valley or valleys between teeth.

Further, and in one preferred embodiment, the engagement feature 72, 98, 150, 220 is configured to resist wear and damage. In particular, where the engagement feature 72, 98, 150, 220 is in the form of a dominant tooth or a dominant valley, the corresponding tooth or valley is preferably constructed of or defined by a material harder than that used for the remaining reel teeth (i.e., the guide teeth). For example, the reel or guide teeth are typically formed of glass filled polycarbonate; the tooth arrangement defining the engagement feature 72, 98, 150, 220 is preferably formed of high modulus polycarbonate or aluminum. Additionally or alternatively, that portion of the tape reel assembly 14 otherwise defining the engagement feature 72, 98, 150, 220 is preferably coated with a protective material. This one preferred embodiment is illustrated in FIG. 7 whereby a protective coating 180 (shown generally in FIG. 7) is placed over the dominant tooth 160. The protective coating 180 can assume a variety of forms, for example, nickel or chrome.

Finally, where the engagement feature 72, 98, 150, 220 is formed as a modification of a "standard" reel tooth or teeth, the resulting dominant surface (e.g., dominant teeth or dominant valley) is preferably more precisely formed (e.g., molding tolerances, inspection/repair, etc.) as compared to others of the reel teeth (i.e., the guide teeth) to further ensure desired drive clutch interface.

Figure 9A:
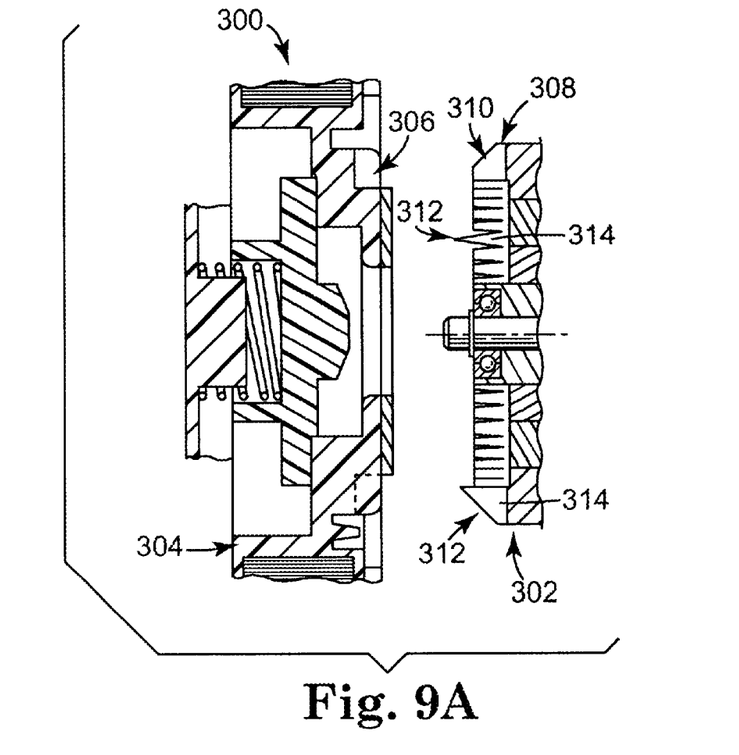
FIG. 9A is a cross-sectional view of portions of a data storage tape cartridge and a tape drive clutch including an engagement feature in accordance with the present invention prior to operative engagement.

The enhanced reel/clutch engagement provided by the present invention may also be achieved by configuring the drive clutch to include the engagement feature 72, 98, 150, 220. For example, FIG. 9A is a cross-sectional view of portions of a data storage tape cartridge 300 and a drive clutch 302 in accordance with the present invention prior to operative engagement. The data storage tape cartridge 300 is of a type known in the art, and includes a tape reel assembly 304 forming a ring of reel teeth 306 (referenced generally). Unlike previous embodiments, the reel teeth 306 are not modified to form or provide an engagement feature (e.g., dominant valley or dominant tooth), but instead are "standard" and substantially uniform.

Figure 9B:
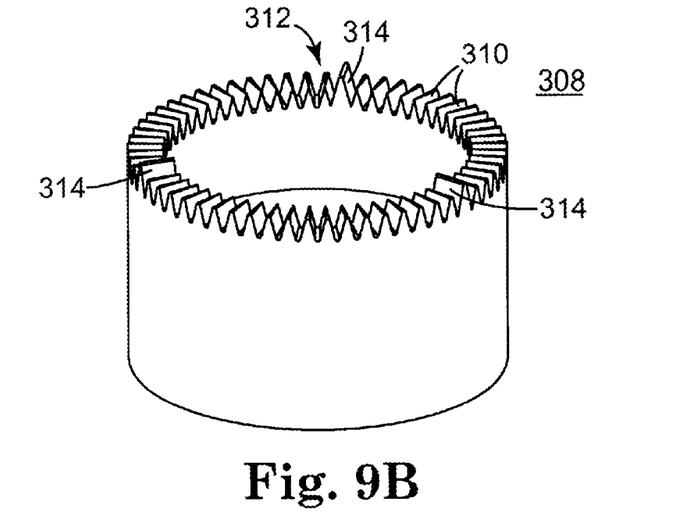
FIG. 9B is a side, perspective view of a chuck portion of the drive chuck of FIG. 9A.

With the above components of the data storage tape cartridge 300 in mind, the drive clutch 302 includes a chuck 308 forming a ring of outwardly projecting drive clutch teeth 310 and engagement features 312 (referenced generally). The chuck 308 is shown in greater detail in FIG. 9B. In a preferred embodiment, the engagement features 312 consists of three, equidistantly spaced dominant teeth 314 (best shown in FIG. 9B), akin to the dominant teeth 76 previously described with respect to the embodiment of FIG. 5. The dominant teeth 314 each have a length or height greater than that of the remaining drive clutch teeth 310, such that the dominant teeth 314 dictate or establish a final interface plane relative to the reel teeth 306 upon engagement between the drive clutch 302 and the reel teeth 306. Alternatively, the engagement feature associated with the drive clutch 302 can assume any of the other forms previously described with respect to the tape reel embodiments (FIGS. 6–8). Regardless of form, the engagement features 312 establish a dominant pitch line that is "above" a guide pitch line defined by the remaining reel teeth 306 (recalling that the guide pitch line excludes the engagement features 312). This, in turn, is dictated by the engagement features 312 having either a wider width tooth at the guide pitch line or a narrower width valley at the guide pitch line as compared to a width of the guide teeth or guide valleys, respectively, at the guide pitch line.

The tape reel assembly and related data storage tape cartridge or drive clutch of the present invention provides a marked improvement over previous designs. In particular, by incorporating an engagement feature, preferably in the form of a dominant tooth or valley, known contact/engagement points between the tape reel assembly and associated drive clutch are provided. A dominant pitch line is established by three minimum points (otherwise necessary to form a plane) that is separate from a guide pitch line defined by multiple guide teeth. These pre-defined points of contact serve to reduce hub run-out and elevation error, thereby allowing for more narrow tape flange tape spools and reduced flange taper. These features, in turn, can result in lowering guiding forces, and reduced lateral tape motion at the read/write head during use.

Although the present invention has been described with reference to preferred embodiments, workers skilled in the art will recognize that changes can be made in form and detail without departing from the spirit and scope of the present invention. For example, while preferred dimensions have been ascribed to various embodiments, these dimensions are in no way limiting. Preferably, selected dimension(s) of the engagement features are selected based upon what dimensions would cause the dominant tooth/valley to overcome the molding errors in the remaining teeth and thus define the pitch line. Any increase over these minimum dimensions would simply increase the distance/angle a tape reel hub would "tip" if it were dislodged from the stable three dominant teeth arrangements, or if a dominant teeth arrangement were damaged during use. In either case, the tape reel hub would establish a new pitch line based on different tooth-to-valley mating. In the interest of design robustness, the selected engagement feature dimension(s) preferably minimize distance between guide teeth of the reel and drive clutch teeth or guide teeth of the drive clutch and tape reel teeth. Further, while the various embodiments have included a ring of tape reel teeth (or drive clutch teeth) in addition to the dominant teeth/valley, in an alternative embodiment, only the dominant teeth/valleys are included.

What is claimed is:

1. A tape reel assembly for a data storage tape cartridge, the tape reel assembly comprising:
    a hub defining a tape-winding surface;
    opposing upper and lower flanges extending in a radial fashion from opposing sides of the hub, respectively;
    a plurality of reel teeth extending axially outwardly relative to the hub, the reel teeth being circularly arranged; and
    three engagement features equidistantly spaced within the reel teeth;
    wherein the engagement features are each configured to provide a dominant mating surface relative to surfaces of the plurality of reel teeth for mating with teeth of a tape drive clutch.

2. The tape reel assembly of claim 1, wherein the engagement features each define a feature selected from the group consisting of a dominant tooth and a dominant valley.

3. The tape reel assembly of claim 1, wherein the plurality of reel teeth define a guide pitch line, and further wherein each engagement feature includes a dominant tooth having a width at the guide pitch line that is greater than a width of the plurality of reel teeth at the guide pitch line.

4. The tape reel assembly of claim 1, wherein the plurality of reel teeth define a plurality of valleys that define a guide pitch line, and further wherein each engagement feature includes a dominant valley having a width at the guide pitch line that is less than a width of the plurality of valleys at the guide pitch line.

5. The tape reel assembly of claim 1, wherein the plurality of reel teeth define a guide pitch line and the engagement features define a dominant pitch line, and further wherein the dominant pitch line is above the guide pitch line.

6. The tape reel assembly of claim 1, wherein the plurality of reel teeth define a maximum axial height, and further wherein each of the engagement features is configured to provide an engagement surface positioned axially beyond the maximum axial height, the engagement surface being configured to engage the tape drive clutch teeth.

7. The tape reel assembly of claim 6, wherein each of the engagement features includes a dominant tooth circumferentially aligned with, and extending from a point commensurate with, the plurality of reel teeth, each dominant tooth having a height greater than the maximum axial height.

8. The tape reel assembly of claim 1, wherein adjacent ones of the plurality of reel teeth combine to define a guide valley for generally receiving a drive clutch tooth, a minimum depth being defined by the guide valleys, and further wherein each of the engagement features define a dominant valley circumferentially aligned with the guide valleys, the dominant valleys having a depth less than the minimum depth.

9. The tape reel assembly of claim 1, wherein the engagement features include a protective coating not otherwise provided with the plurality of reel teeth.

10. The tape reel assembly of claim 1, wherein the engagement features are formed by a material different from a material of the plurality of reel teeth.

11. A data storage tape cartridge comprising:
a housing including a base and a cover combining to define an enclosed space, the base forming at least one tape reel opening;
at least one tape reel assembly comprising:
a hub defining a tape-winding surface,
opposing upper and lower flanges extending in a radial fashion from opposing sides of the hub, respectively,
a plurality of reel teeth extending axially outwardly relative to the hub, the reel teeth being circularly arranged,
three engagement features equidistantly spaced within the reel teeth,
wherein the at least one tape reel assembly is disposed within the housing such that the reel teeth and engagement features are accessible through the tape reel opening; and
a storage tape wound about the tape-winding surface of the hub;
wherein the engagement features are each configured to provide a dominant mating surface relative to surfaces of the plurality of reel teeth for mating with teeth of a tape drive clutch upon insertion of the data storage tape cartridge into a tape drive.

12. The data storage tape cartridge of claim 11, wherein the plurality of reel teeth define a guide pitch line, and further wherein each engagement feature includes a dominant tooth having a width at the guide pitch line that is greater than a width of the plurality of reel teeth at the guide pitch line.

13. The data storage tape cartridge of claim 11, wherein the plurality of reel teeth define a plurality of valleys that define a guide pitch line, and further wherein each engagement feature includes a dominant valley having a width at the guide pitch line that is less than a width of the plurality of valleys at the guide pitch line.

14. The data storage tape cartridge of claim 11, wherein the plurality of reel teeth define a guide pitch line and the engagement features define a dominant pitch line, and further wherein the dominant pitch line is above the guide pitch line.

15. The data storage tape cartridge of claim 11, wherein the plurality of reel teeth define a maximum axial height, and further wherein each of the engagement features are configured to provide an engagement surface positioned axially beyond the maximum axial height, the engagement surface being configured to engage the tape drive clutch teeth.

16. The data storage tape cartridge of claim 11, wherein adjacent ones of the plurality of reel teeth combine to define a guide valley for generally receiving a drive clutch tooth, a minimum depth being defined by the guide valleys, and further wherein each of the engagement features define a dominant valley circumferentially aligned with the guide valleys, the dominant valleys having a depth less than the minimum depth.

17. A tape reel assembly for a data storage tape cartridge, the tape reel assembly comprising:
a hub defining a tape-winding surface;
opposing upper and lower flanges extending in a radial fashion from opposing sides of the hub, respectively; and
a plurality of reel teeth extending axially outwardly relative to the hub, the reel teeth being circularly arranged and each reel tooth being defined by opposing side surfaces, wherein the plurality of reel teeth include:
a plurality of guide teeth, the opposing surfaces of which correspond in length with a guide tooth length and in angular orientation with a guide tooth angular orientation,
three equidistantly spaced dominant tooth arrangements each including at least one dominant tooth, wherein at least one of the opposing side surfaces of each of the dominant teeth has a characteristic selected from the group consisting of a dominant length differing from the guide tooth length and a dominant angular orientation differing from the guide tooth angular orientation.

18. The tape reel assembly of claim 17, wherein the dominate length is greater than the guide tooth length such that the dominant teeth establish a dominant pitch line that is more distally spaced from the hub than a guide pitch line of the guide teeth.

19. The tape reel assembly of claim 17, wherein the guide teeth and the dominant teeth extend to the same axial height, and further wherein the dominant length is less than the guide tooth length such that each of the dominant tooth arrangements define a dominant valley.

20. The tape reel assembly of claim 17, wherein the dominant angular orientation is greater than the guide tooth angular orientation such that each of the dominant tooth arrangements have a pitch line width differing from a pitch line width of the guide teeth at a guide pitch line defined by the guide teeth.

21. The tape reel assembly of claim 17, wherein the dominant tooth arrangements are configured to prevent meshed engagement of tape drive clutch teeth with the guide teeth during use.

22. A tape drive clutch of a tape drive mechanism for operatively engaging tape reel teeth of a data storage tape cartridge, the tape drive clutch comprising:
a plurality of drive clutch teeth; and
three engagement features equidistantly spaced within the drive clutch teeth;
wherein the engagement features are each configured to provide a dominant mating surface relative to surfaces of the drive clutch teeth for mating with teeth of a tape reel.

23. The tape drive clutch of claim 22, wherein the engagement features each define a feature selected from the group consisting of a dominant tooth and a dominant valley.

* * * * *